(12) United States Patent
Alley

(10) Patent No.: US 7,302,732 B2
(45) Date of Patent: Dec. 4, 2007

(54) DUAL BLADE WINDSHIELD WIPER WITH SCRAPER

(76) Inventor: David J. Alley, 9950 W. Vassar Way, Lakewood, CO (US) 80227

( * ) Notice: Subject to any disclaimer, the term of this patent is extended or adjusted under 35 U.S.C. 154(b) by 0 days.

(21) Appl. No.: 11/354,389

(22) Filed: Feb. 15, 2006

(65) Prior Publication Data

US 2007/0186366 A1    Aug. 16, 2007

(51) Int. Cl.
    B60S 1/28    (2006.01)
    B60S 1/40    (2006.01)
    B60S 1/38    (2006.01)

(52) U.S. Cl. .............. 15/250.4; 15/250.41; 15/250.33; 15/250.23

(58) Field of Classification Search .............. 15/250.33, 15/250.4, 250.41, 250.22, 250.23, 105, 118
    See application file for complete search history.

(56) References Cited

U.S. PATENT DOCUMENTS

| 1,749,049 | A | * | 3/1930 | Turner ..................... | 15/250.33 |
| 1,946,009 | A | * | 2/1934 | Besson .................... | 15/250.04 |
| 1,953,703 | A | * | 4/1934 | Dirienzo ................... | 15/250.4 |
| 2,284,976 | A | * | 6/1942 | Horton et al. ............. | 15/250.4 |
| 3,117,336 | A | * | 1/1964 | Reese ..................... | 15/250.452 |
| 3,238,555 | A | * | 3/1966 | Cels ....................... | 15/250.04 |
| 3,631,561 | A | * | 1/1972 | Aszkenas ................. | 15/250.41 |
| 5,625,919 | A | * | 5/1997 | Jeffer ..................... | 15/250.41 |

* cited by examiner

Primary Examiner—Gary K. Graham
(74) Attorney, Agent, or Firm—Scott L. Terrell

(57) ABSTRACT

A windshield wiper is provided which includes a wiper frame; a scraper having an upper and a lower surface defining opposite leading edges, the upper surface connected to the wiper frame, wherein the wiper frame and scraper form an assembly having a means for rotation about a fixed point relative to a wiper arm; and at least one wiping blade connected to the lower surface of the scraper.

5 Claims, 6 Drawing Sheets

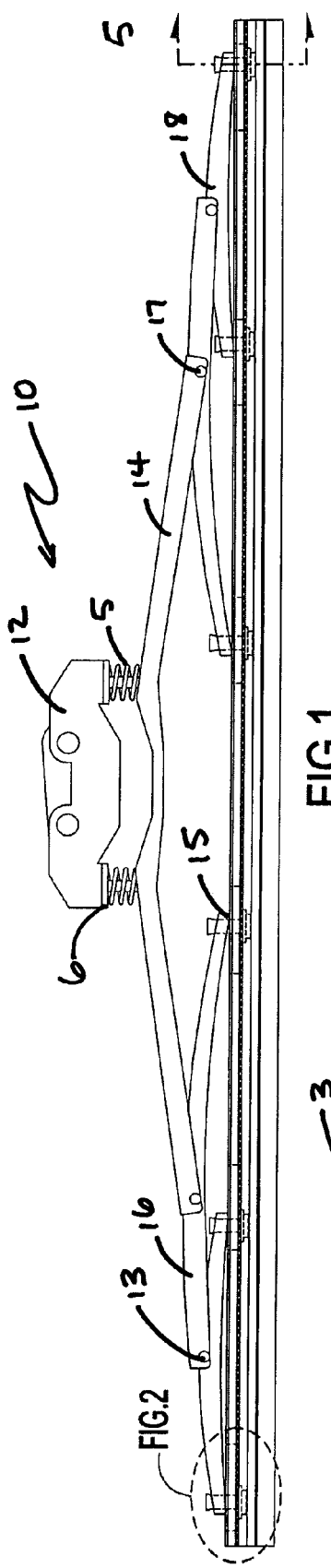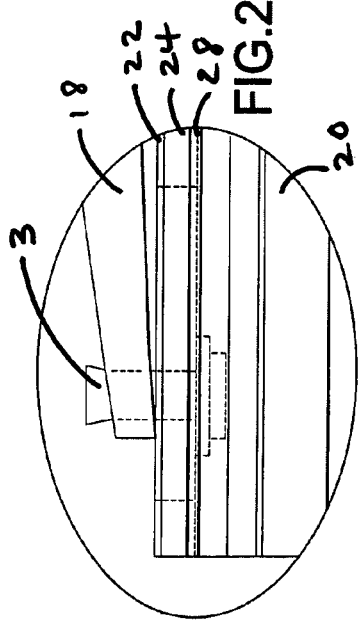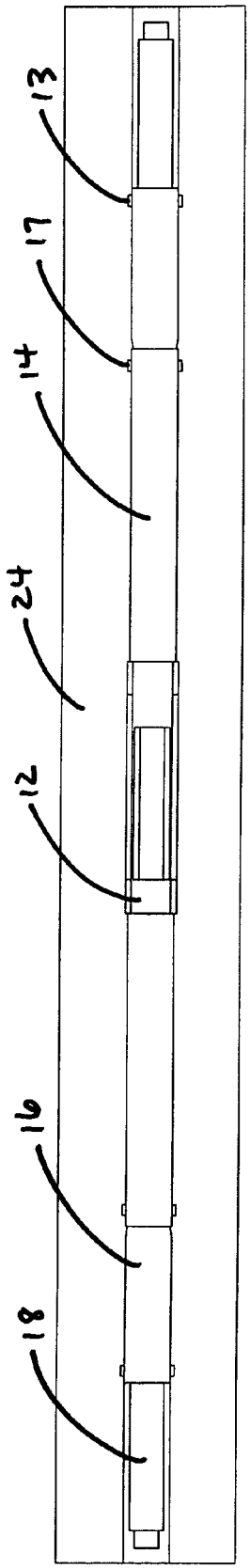

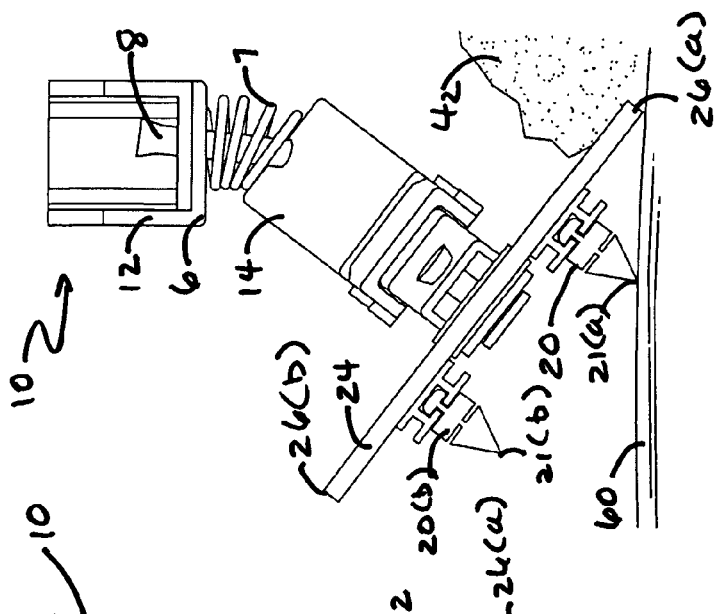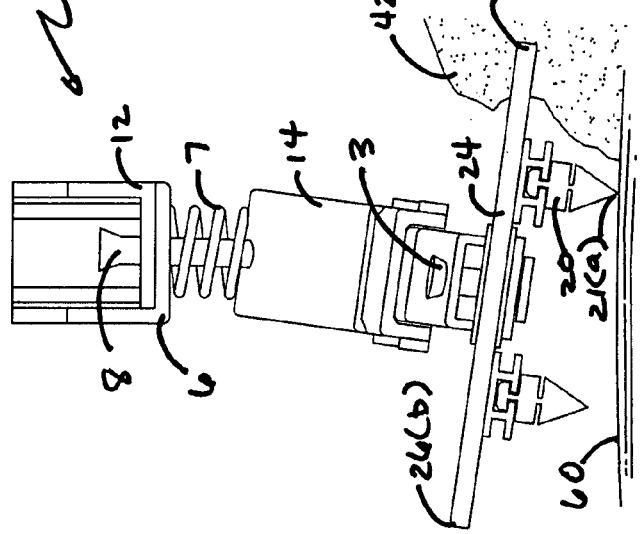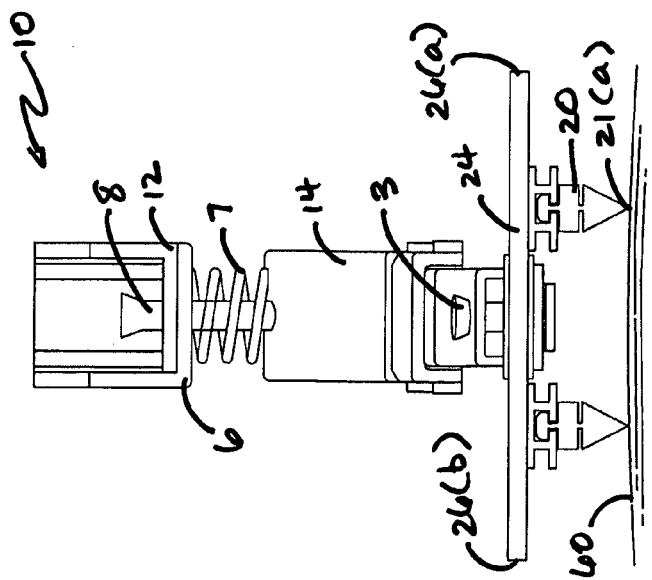

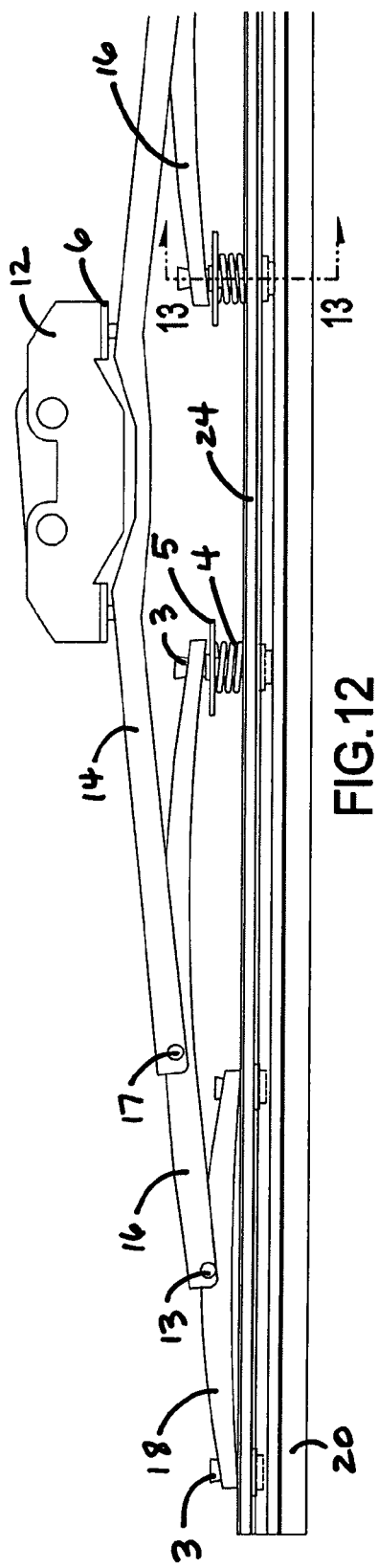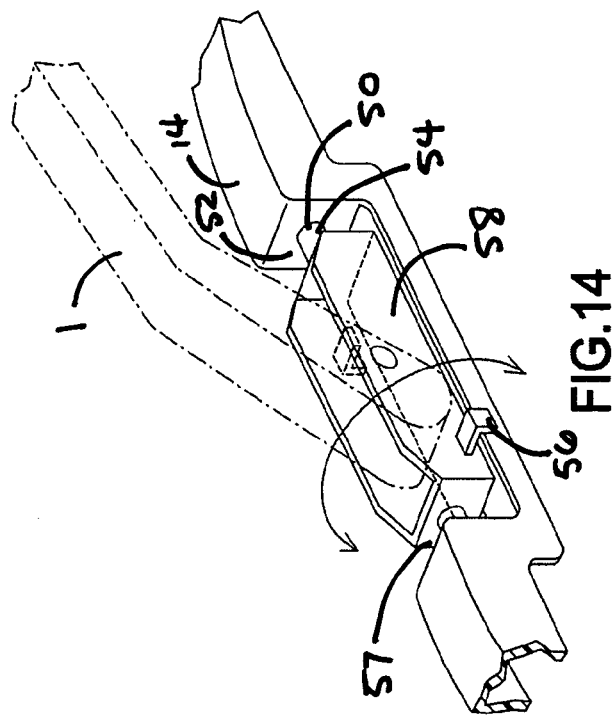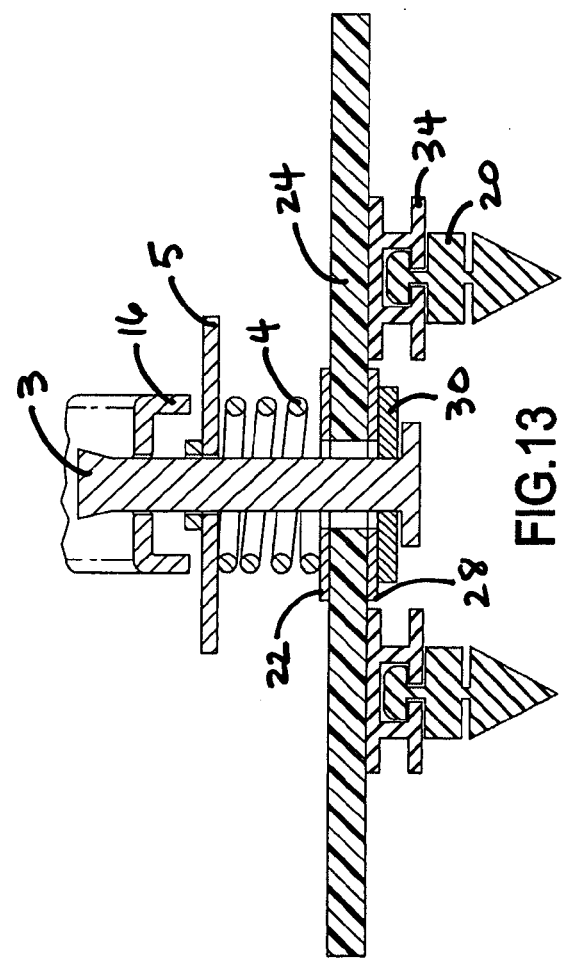

DUAL BLADE WINDSHIELD WIPER WITH SCRAPER

CROSS REFERENCE TO RELATED APPLICATIONS

Not Applicable.

BACKGROUND OF THE INVENTION

1. Field of the Invention

The present invention relates to windshield wipers. In particular, it relates to a windshield wiper and scraper assembly for removing snow and ice.

2. Description of the Related Art

It is well known that one problem with conventional windshield wiper assemblies is that even while wiping the windshield of a motor vehicle free of moisture and debris, often times the vehicle must be stopped to clear the windshield of heavy accumulations of snow and ice, manually using a scraper. A solution is to provide a windshield wiper and scraper assembly which functions to wipe the windshield clear of moisture and small debris, but which is also used to remove heavy accumulations of snow and ice from the windshield, while driving.

Up to now few such examples exist. One such example, EPO. Pub. No. 0,100,622 (filed Jul. 15, 1983) to Knibbs, discloses a windscreen wiper including a flexible wiping member and two bearing members on each side of the wiping member, the bearing members being brushes or scrapers and having a depth relative to the wiping element which is such that, in use, with the wiping member deflected its free end rests under the free end of the bearing member.

Another example, U.S. Pat. No. 3,892,006, (filed Sep. 16, 1974) to Yasumoto, discloses a rotatable wiper, substantially cylindrical in shape and adaptable for mounting on a conventional oscillating windshield wiper arm. The rotatable wiper uses a plurality of radially-spaced, longitudinally-extending blade-pairs of resilient material formed around a flexible, heated shaft member for wiping moisture and other matter from a vehicle windshield. To remove snow and ice, the wiper is heated by an electrical heating element located in the center of the wiper shaft and connected to an external power supply.

In yet another example, U.S. Pat. No. 6,748,621 (filed Jun. 15, 2004), to Root, discloses a wiper assembly having a set of windshield wipers designed to scrub insects and minor debris from the windshield of a vehicle. This assembly includes a bridge member that has a first and a second end, and a medial portion. The first and second ends are for attachment to a blade member. The medial portion is for attachment to a wiper arm of a vehicle. The blade member is for providing support to a plurality of vertical cleaning members and a cleaning blade. The cleaning members and the cleaning blade are for cleaning debris from the windshield.

Improvements in the prior art, including the foregoing examples, evolve along a common conception in the design of windshield wipers. As such, these designs focus on the inclusion of wiping, brushing, and scrapping members which rotate about a fixed point relative to an oscillating wiper arm. In the prior art, rotation of the wiper frame is accomplished with a variety of cylindrical or linkage assembly connections in the wiper frame. Rotation of the wiper frame, is actuated either electronically or physically through the frictional force generated while the wiping blade is in oscillating motion and in contact the windshield surface. Oscillation of the wiper arm thereby translates into a back and forth motion of the wiper frame.

While the foregoing examples offer some utility, a major disadvantage in each lies in the fact that, while they do provide for a brushing or scrapping of debris, they do not combine to scrape and lift a load of snow or ice from the surface of a windshield while traveling. The foregoing examples also do not provide for quick and easy installation, and are rather complex in construction. Many of the foregoing examples may also be susceptible to malfunction upon freezing in severe conditions. Thus, it is desirable to provide a windshield wiper and scraper assembly for selectively removing moisture or a mass of snow and ice from the windshield of a motor vehicle, but which is universal for use with a number of conventional wiper arms and is lightweight and simple in construction. The present invention satisfies these needs.

BRIEF SUMMARY OF THE INVENTION

It is therefore an object of the present invention to provide a windshield wiper and scraper assembly for use in selectively removing moisture or a load of snow and ice from the windshield of a motor vehicle.

It is another object of the present invention to provide a windshield wiper and scraper assembly which may be attached to a variety of conventional wiper arms.

It is another object of the present invention to provide a windshield wiper and scraper assembly which, in use, is simple in installation and removal.

It is yet another object of the present invention to provide a windshield wiper and scraper assembly which is lightweight and simple in construction.

To overcome the problems of the prior art methods and in accordance with the purpose of the invention, as embodied and broadly described herein, briefly, a windshield wiper is provided which includes a wiper frame; a scraper having an upper and a lower surface defining opposite leading edges, the upper surface connected to the wiper frame, wherein the wiper frame and scraper form an assembly having a means for rotation about a fixed point relative to a wiper arm; and at least one wiping blade connected to the lower surface of the scraper.

Additional advantages of the present invention will be set forth in part in the description that follows and in part will be obvious from that description or can be learned from practice of the invention. The advantages of the invention can be realized and obtained by the apparatus particularly pointed out in the appended claims.

BRIEF DESCRIPTION OF THE SEVERAL VIEWS OF THE DRAWINGS

The accompanying drawings, which are incorporated in and which constitute a part of the specification, illustrate at least one embodiment of the invention and, together with the description, explain the principles of the invention.

FIG. 1 is a side elevation view of the present invention showing one embodiment of a linkage for rotation of the wiper frame relative to a fixed point on the wiper arm.

FIG. 2 is an enlarged view of an end of the wiper frame and scraper assembly, of FIG. 1, showing a lap joint connection of the mounting bracket to the scraper and squeegee.

FIG. 3 is a top elevation view of the wiper frame and rectangular scraper assembly.

FIG. 9 is a cross sectional view of the wiping edges of the wiping blade in contact with windshield where the scraper is in a horizontal relationship to the plane of the windshield.

FIG. 10 is a cross sectional view of a wiper and scraper assembly showing an angular rotation of the wiper frame and scraper in relation to the plane of the windshield when contacting a mass of snow.

FIG. 11 is a cross sectional view of a wiper and scraper assembly showing angular rotation of the wiper frame and scraper where the scraper acts as a wedge used to scrape and lift a mass of snow from the surface of the windshield.

FIG. 12 is a side elevation view a second embodiment of the wiper and scraper assembly showing another linkage assembly for rotation of the wiper frame relative to a fixed point of a wiper arm.

FIG. 13 is a cross sectional view of the wiper and scraper assembly, along section 13 of FIG. 12.

FIG. 14 is a perspective view of yet another embodiment of the wiper frame showing an axle and hub connection between the medial shell portion of the wiper superstructure and the end walls of the wiper arm connector used for rotation of the wiper frame relative to a fixed point on a wiper arm.

DETAILED DESCRIPTION OF THE INVENTION

Figure 4:
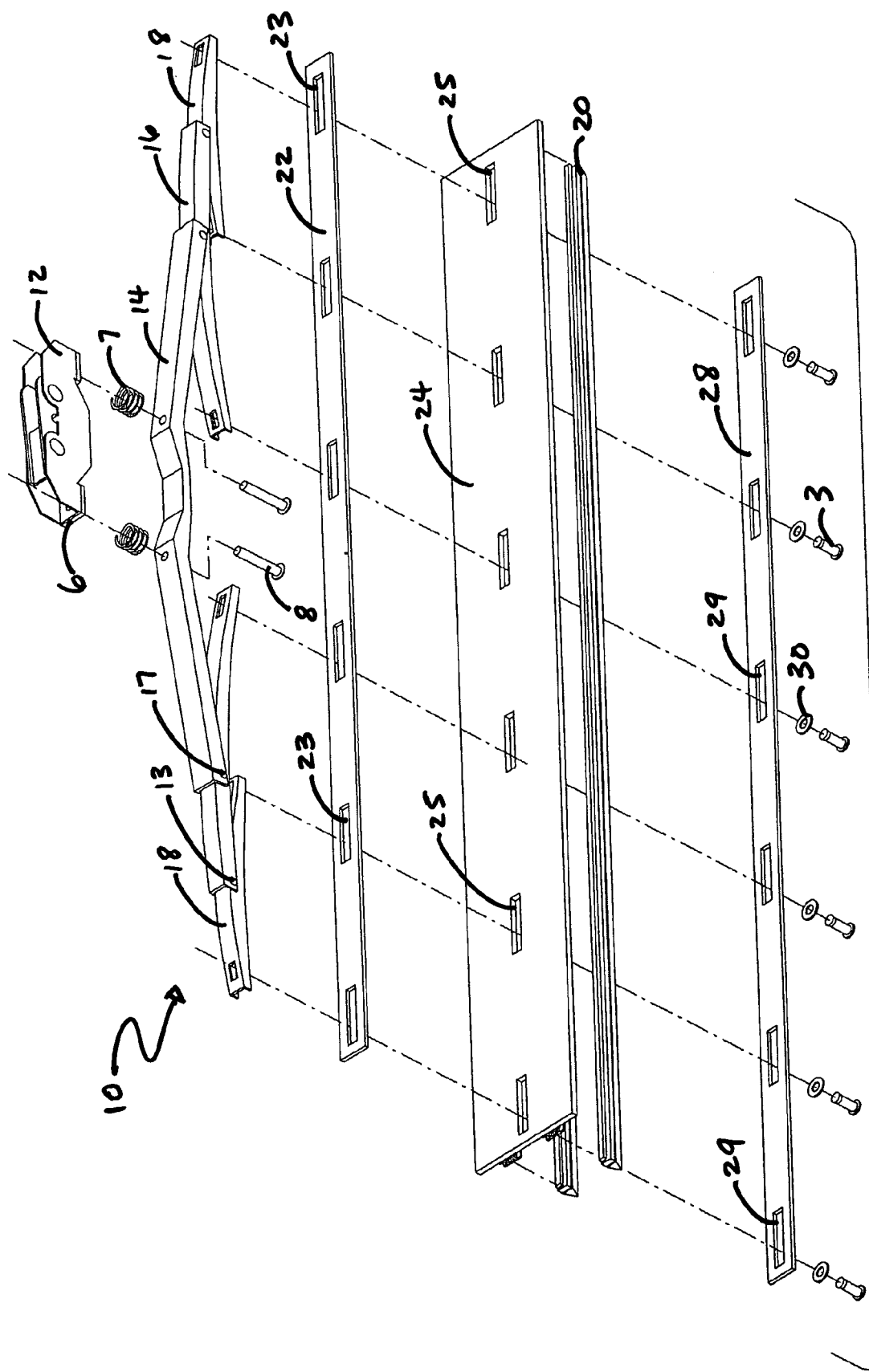
FIG. 4 is an exploded view of an embodiment of the wiper and scraper assembly shown in FIG. 1.
Figure 5:
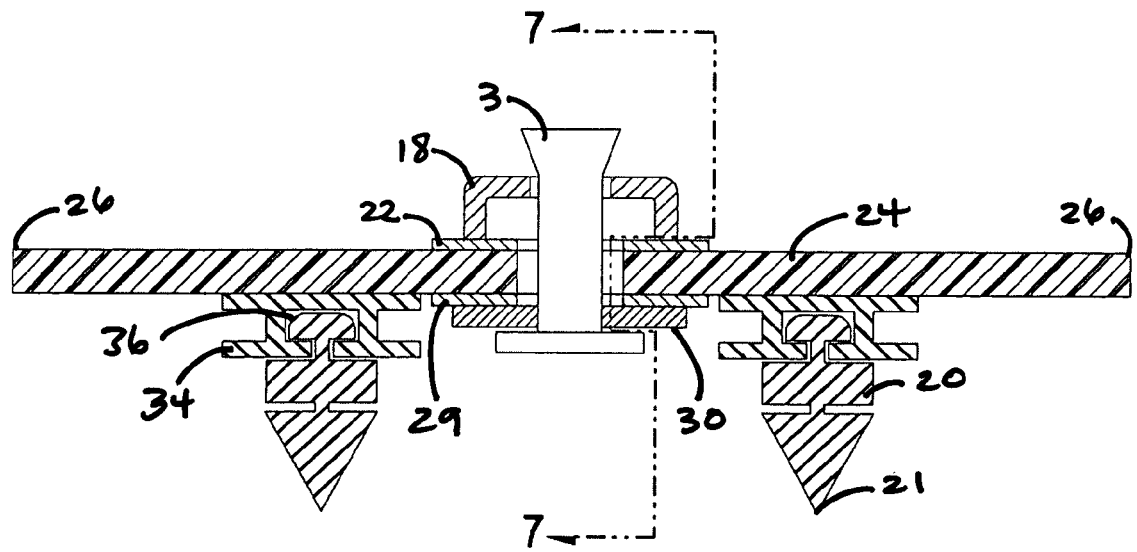
FIG. 5 is a sectional view, along section 5 of the assembly of FIG. 1, showing the wiping blades keyed into channel members connected to the lower surface of the scraper.
Figure 6:
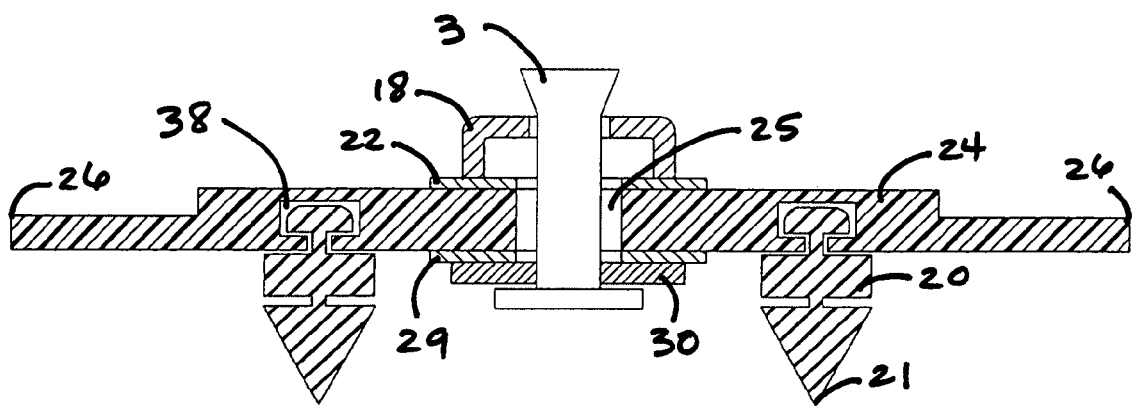
FIG. 6 is a sectional view of the wiper and scraper assembly showing the wiping blades keyed into channels cut into the lower surface of the scraper.

Unless specifically defined otherwise, all technical or scientific terms used herein have the same meaning as commonly understood by one of ordinary skill in the art to which this invention belongs.

Although any methods and materials similar or equivalent to those described herein can be used in the practice or testing of the present invention, the preferred methods and materials are now described. Reference will now be made in detail to the presently preferred embodiments of the invention, examples of which are illustrated in the accompanying drawings wherein like numerals represent like features of the invention.

The present invention is a windshield wiper and scraper assembly 10 which attaches easily to a conventional windshield wiper arm 1 for use in the removal of snow and ice from the windshield 60 of a motor vehicle. In use, the wiper and scraper assembly 10 connects to an oscillating wiper arm (not shown) and is configured to achieve an angular rotation of the scraper 24 where the leading edge 26 biases against the surface of a windshield 60. In the downward position, the scraper 24 and leading edge 26 act as a wedge to scrap and lift a load of snow or ice from the windshield 60 while a wiping edge 21 of a wiping blade 20 follows to clear the windshield 60 of liquid and minor debris.

Turning now to FIGS. 1, and 7-11, where it is shown at least one embodiment of the present invention, a linkage assembly is used to connect the superstructure 14 of the wiper frame to a wiper arm connector 12. The wiper frame includes a the wiper arm connector 12, for pivotal attachment to a wiper arm 1, a wiper superstructure 14, wiper lever arms 16, and mounting brackets 18. The superstructure 14, lever arms 16 and mounting brackets 18 are preferably formed of an alloy or polymer material, are tubular in construction, bowed for elastic deformation, and have opposite ends. These components of the wiper frame assembly are well known in the art. The opposed ends of the superstructure 14 are pivotally attached using pins 17 to a medial portion of the wiper lever arms 16, which are, in turn, pivotally attached using pins 13 to a medial portion of the mounting brackets 18. The mounting brackets 18 include claws 15 for slidably receiving a rectangular upper plate 22 formed of an alloy or polymer material. The upper plate 22 includes a plurality of slots 23, and is secured to the ends of the mounting brackets 18 and the wiper lever arms 16 by clamping the claws around the edges of the upper plate 22. The scraper 24 is a deformable long rectangular strip of an alloy or polymeric material having an acceptable degree of stiffness. The scraper 24 has an upper and a lower surface defining opposite leading edges 26 and slots 25. In use, as the wiper arm 1 oscillates, the leading edges 26($a$) and 26($b$) alternate, in an angular alignment relative to the plane of the windshield 60, to scrape the windshield 60 surface. The lower plate 28 is a rectangular support member having an upper and lower surface and a plurality of slots 29. In a preferred embodiment, the upper plate 22, scraper 24 and lower plate 28 form a composite structure with a tension lap joint connection. It can readily be appreciated by one of skill in the art, that this composite structure may be formed as a single unit. The composite structure is slidably connected to the mounting bracket 18 and lever arm 16 ends of the wiper frame using pin, rivet, or bolt connectors 3 received through the respective slots, when aligned, in a number sufficient to withstand a shear stress.

Figure 7:
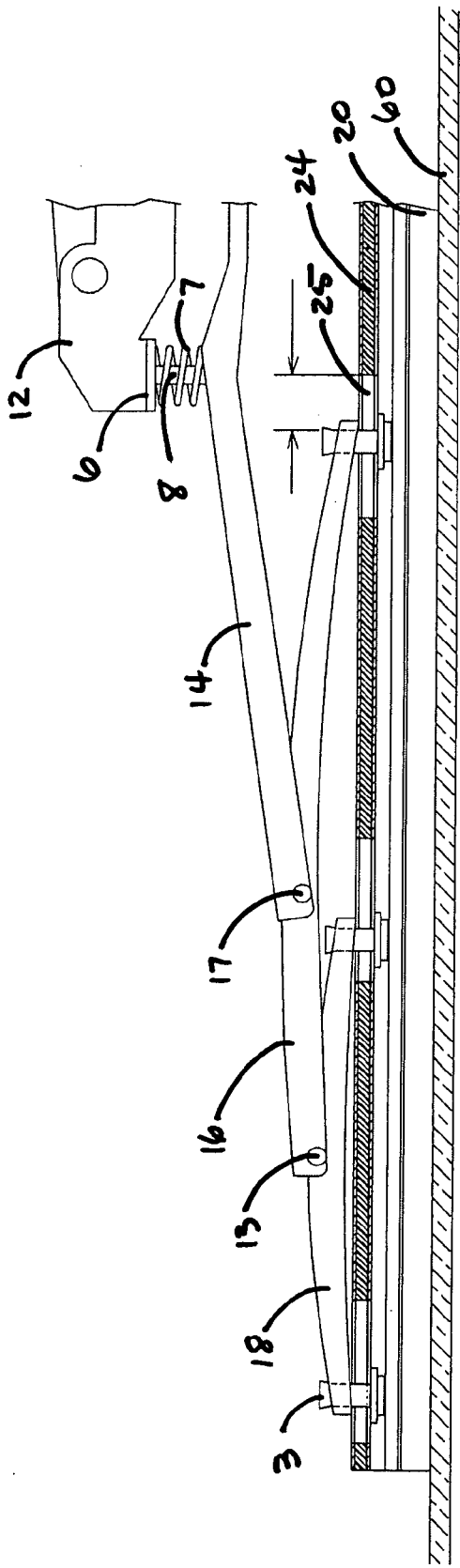
FIG. 7 is a sectional view of the wiper and scraper assembly, at section 7 of FIG. 5, which illustrates a slotted lap seam connection between the scraper and the wiper lever and mounting bracket members of the wiper frame.
Figure 8:
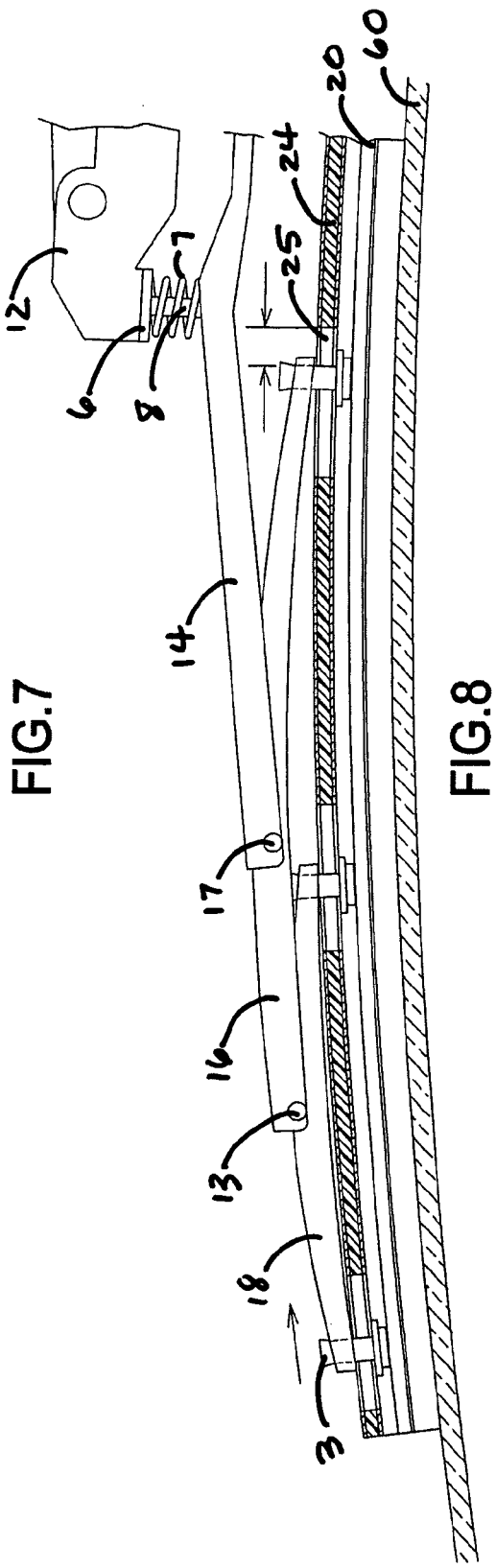
FIG. 8 is a side elevation view of the wiper and scraper assembly shown in FIG. 1, which illustrates linear motion in the slotted lap seam for deformation of the scraper relative to a contour of the windshield.

As shown in FIGS. 7, 8, the slots 23, 25, 29, are provided so as to allow the scraper 24 to deform relative to the curvature of the windshield 60 when the wiper arm 1 is engaged to oscillate back and forth. The wiping blades 20 are conventional squeegees and include wiping edges 21. The wiping blades 20 are connected in complimentary channels 36, 38 to the lower surface of the scraper 24. The channels 36, 38 are either cut longitudinally in the lower surface of the scraper 24 or provided in channel members 34 connected to the lower surface of the scraper 24, using any method well known in the art.

In order for the leading edges 26 of the scraper 24 to alternately bias against the windshield 60 surface, the wiper frame rotates about a fixed point relative to the wiper arm 1. Rotation of the wiper frame is achieved using any method well known in the art including locating complimentary cylinders, axles, and/or linkage connections in the wiper frame, or between the wiper frame and scraper 24 composite structure (not shown).

In FIG. 9, the wiper arm connector 12 is pivotally attached to the superstructure 14 of the wiper frame with pins 8. The pins 8 are circumscribed with elastic members 7, such as springs or bushings (not shown), fitted between a bottom wall 6 of the wiper connector 12 and the top wall of the super structure 14. The pins 8 aid in the prevention of spring buckle, and, while dampening vibration in the system within an elastic region, maintain a force of the assembly 10 against the windshield 60. Absent a load of snow 42 and ice, the scraper blade 24 travels in a horizontal position, relative to the plane of the windshield 60, where the wiping edges 21 of the wiping blades 20 contact the windshield 60 surface to clean the windshield of rain, dirt, and insects.

A unique aspect of the present invention is the manner in which it operates to clean and lift a snow and ice load from the surface of the windshield. When contacting a mass of snow 42 or ice the wiper and scraper assembly 10 rotates and an angle downwardly such that the scraper 24 and proximal leading edge 26(a) form a wedge to lift and scrap the snow 42 from the surface of the windshield 60. As illustrated in FIG. 10, upon initial engagement of the proximal leading edge 26(a) to a snow 42 load, the leading edge 26(a) of the scraper blade 24 is driven downwardly, and the spring like members 7 alternately compress and extend to dampen vibration in the system. At the same time, the scraper leading edge 26(b) distal to the load angles upwardly in relation to the plane of the windshield 60.

In FIG. 11, the scraper 24 is shown to accelerate through a snow load 42 where the leading edge 26(a), proximal to the snow load 42, continues to angle downwardly in relation to the plane of the windshield 60, completing the formation of a wedge, with the leading edge 26(a) and wiping edge 21(a) of the wiping blade 20(a) biased against the windshield 60 surface. The wiping blade 20(a) follows the leading edge 26(a) to clean the windshield 60 free of any remaining moisture and debris. The wedge is thereby defined by vectors passing through coordinate points at the leading edge 26(a), wiping edge 21(a), and at a point located where the wiping blade 20(a) connects to the scraper 24.

Referring now to FIGS. 12 and 13, in another embodiment of the present invention, the wiper frame includes pin 3 and spring 4 linkage assemblies to connect the inner ends of the wiper lever arms 16 to the upper plate 22, scraper 24, and lower plate 28 composite structure. In a like manner, additional pin 3 and spring 4 linkage assemblies may, but need not, be positioned for connection of the mounting bracket 18 ends (not shown) to the composite. As described above, the pins 3 are received through slots 23, 25, 29 in the composite structure and fastened at the lower surface of the lower plate 28 through slotted bushings 30. Elastic members 4, such as springs or bushings (not shown), are positioned about the pins 3 to exert an outward force against spring retainers 5, the lever arms 16, and the upper plate 22. In any manner well known in the art, the wiping blades 20 are slidably connected to the lower surface of the scraper 24 using either channel members 34 fastened to the lower surface with adhesives, rivets, or bolts, or channels cut into the lower surface of the scraper 24, itself.

Turning now to FIG. 14, in yet another embodiment of the present invention, the wiper frame superstructure 14 includes a medial rectangular shell portion having end walls 52, and open side and top portions. Hubs 50 are centrally located in the end walls 52 of the shell portion. The connector 58 is a rigid rectangular member having axles 54, projecting outwardly from the connector end walls 57, press fit into the hubs 50. A contact pressure is thereby created between the hub 50 and axle 54 assemblies. In this manner, the superstructure 14 rotates about the centroid of the connector 58 and superstructure 14 group, as illustrated with a semicircular arrow line, of FIG. 14. The connector 58 may, but need not, include L-shaped bracket members 56 extending laterally from, and attached to, the connector sidewalls 57. In use, the brackets 56 act to stop the degree of angular rotation of the scraper 24 relative to the plane of the windshield 60 at that point where the scraper leading edge 26(a) is in contact the surface of the windshield 60.

While the present invention has been described in connection with the embodiments as described and illustrated above, it will be appreciated and understood by one of ordinary skill in the art that modifications may be made in the wiper and scraper assembly without departing from the true spirit and scope of the invention as described and claimed herein.

I claim:

1. A windshield wiper, comprising:
    (a) a wiper frame having a wiper arm connector pivotally connected to a wiper arm, a wiper superstructure pivotally connected to the wiper arm connector, the superstructure having opposite ends, at least two wiper lever arms having inner and outer opposite ends and a central portion, and at least two mounting brackets having opposite ends and a central portion, the wiper lever arms central portions pivotally connected to the opposite ends of the superstructure, the mounting brackets central portions pivotally connected to the outer opposite ends of the wiper lever arms;
    (b) a scraper having an upper and a lower surface defining opposite leading edges and a plurality of longitudinal slotted void portions extending through the upper and lower surface, the scrapper slidably connected to the mounting bracket opposite ends and the inner opposite ends of the wiper frame through the slotted void portions for continuously deforming the scraper relative to a curvature of a windshield when the wiper arm is traveling in an oscillating motion; and
    (c) at least two wiping blades connected to the lower surface of the scraper.

2. The wiper according to claim 1 wherein the wiper frame further comprises at least two pin and spring linkage assemblies connecting the superstructure to the wiper arm connector.

3. The wiper according to claim 1 wherein the wiper frame further comprises at least two pin and spring linkage assemblies connecting the wiper lever arms inner ends and the scraper through the longitudinal slotted void portions.

4. The wiper according to claim 1 wherein the wiper frame superstructure further comprises a medial rectangular concave face having end walls, the end walls having centrally located inwardly projecting hubs, and wherein the connector comprises a rigid rectangular member having end wall and centrally located outwardly projecting axle members bearing fit into the hubs for rotation about a centroid of the connector and superstructure.

5. The wiper according to claim 4 wherein the connector further comprises an L-shaped bracket members extending laterally from, and attached to, the connector sidewalls for stopping the degree of angular rotation of the scraper relative to the plane of the windshield.

* * * * *